US010250689B2

(12) United States Patent
Kaster

(10) Patent No.: US 10,250,689 B2
(45) Date of Patent: Apr. 2, 2019

(54) SECURITY MONITOR FOR A VEHICLE

(71) Applicant: Robert Bosch GmbH, Stuttgart (DE)

(72) Inventor: Robert Kaster, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 45 days.

(21) Appl. No.: 15/229,228

(22) Filed: Aug. 5, 2016

(65) Prior Publication Data

US 2017/0063996 A1 Mar. 2, 2017

Related U.S. Application Data

(60) Provisional application No. 62/209,432, filed on Aug. 25, 2015.

(51) Int. Cl.
*H04L 29/08* (2006.01)
*H04L 29/06* (2006.01)
*G05B 23/02* (2006.01)
*H04L 12/40* (2006.01)

(52) U.S. Cl.
CPC .......... *H04L 67/12* (2013.01); *H04L 63/1425* (2013.01); *H04L 63/1433* (2013.01); *H04L 63/1441* (2013.01); *G05B 23/0227* (2013.01); *G05B 23/0291* (2013.01); *G05B 2219/25032* (2013.01); *H04L 2012/40215* (2013.01)

(58) Field of Classification Search
None
See application file for complete search history.

(56) References Cited

U.S. PATENT DOCUMENTS

| 2015/0020152 | A1* | 1/2015 | Litichever | H04L 63/14 |
| | | | | 726/1 |
| 2015/0066239 | A1* | 3/2015 | Mabuchi | H04L 63/1408 |
| | | | | 701/1 |
| 2015/0113638 | A1* | 4/2015 | Valasek | H04L 63/1408 |
| | | | | 726/22 |
| 2015/0172306 | A1* | 6/2015 | Kim | H04L 63/1425 |
| | | | | 726/23 |

(Continued)

FOREIGN PATENT DOCUMENTS

| DE | 102008034150 | 1/2010 |
| EP | 2892199 | 7/2015 |
| WO | 2013093591 A1 | 6/2013 |

OTHER PUBLICATIONS

Miller et al., "Remote Exploitation of an Unaltered Passenger Vehicle," Aug. 10, 2015 (91 pages).

(Continued)

*Primary Examiner* — Trang T Doan
(74) *Attorney, Agent, or Firm* — Michael Best & Friedrich LLP

(57) ABSTRACT

A method and system for securing a controlled area network (CAN) of a vehicle is disclosed, where the CAN has a number of electronic control units (ECUs) that control vehicular systems. An on-board diagnostic port of the vehicle is monitored for suspicious activity which does not fit within the baseline profile of the destination ECU. If suspicious activity is detected, countermeasures are taken to minimize harm, such as placing the vehicle in safe mode, reducing the functionality or disabling non-critical ECUs, resetting the targeted ECU, and notifying the driver and non-targeted ECUs.

19 Claims, 3 Drawing Sheets

(56) References Cited

U.S. PATENT DOCUMENTS

2016/0197944 A1* 7/2016 Allouche ............ H04L 63/1416
 726/23
2016/0381055 A1* 12/2016 Galula .................... H04L 67/12
 726/23

OTHER PUBLICATIONS

Valasek et al., "Adventures in Automotive Networks and Control Units," IOActive, 2014, (99 pages).
Extended European Search Report for Application No. 16184645.6 dated Dec. 21, 2016 (8 pages).
Office Action from the European Patent Office for Application No. 16184645.6 dated Feb. 13, 2018 (5 pages).
Larson, Ulf E. et al., "An Approach to Specification-based Attack Detection for In-Vehicle Networks", 2008 IEEE Intelligent Vehicles Symposium, Jun. 4-6, 2008, pp. 220-225, Eindhoven University of Technology.
Hoppe, Tobias et al., "Security Threats to Automotive CAN Networks—Practical Examples and Selected Short-Term Countermeasures", Computer Safety, Reliability, and Security [Lecture notes on computer science], Sep. 22, 2008, pp. 235-248, Springer Berlin Heidelberg, Berlin.
International Search Report and Written Opinion for Application No. PCT/EP2016/069598 dated Nov. 15, 2016 (11 pages).

* cited by examiner

SECURITY MONITOR FOR A VEHICLE

RELATED APPLICATIONS

This non-provisional application claims priority from U.S. provisional application Ser. No. 62/209,432 filed on Aug. 25, 2015, the entire contents of which are hereby incorporated by reference.

BACKGROUND

Embodiments of the invention relate to the field of vehicle security systems.

It is possible for Electronic Control Units (ECUs) of vehicles to experience unauthorized access or tampering activities. Such unauthorized access could result in a loss of control of some vehicle systems, including critical systems like braking and steering. Since the ECUs that control vehicle systems may be interconnected in a Controlled Area Network (CAN), it is possible that an unauthorized access to one system ECU could pivot into an attack on other networked ECUs.

SUMMARY

In one embodiment, the invention provides a method of securing a controlled area network (CAN) of a vehicle, the CAN having a. plurality of electronic control units (ECUs) for controlling electronically-controlled vehicular systems. The method comprises monitoring an on-board diagnostic (OBD or OBDII) port of the vehicle for activity, generating an alert when any monitored activity is suspicious activity, and counteracting the suspicious activity to minimize potential harm resulting from the suspicious activity. The method includes notifying the driver of any suspicious activity. In some embodiments, the method includes counteracting the attack by shutting off power, placing the vehicle in safe mode, flooding the Controlled Area Network (CAN) bus so that some of the electronic control units (ECUs) in the CAN operate at a reduced level of functionality and others are disabled, or sending a reset command to the ECU module being attacked.

A method according to the invention includes at least one physical computer storage medium including stored instructions. The stored instructions, when executed, perform operations to monitor the OBDII port security. The operations include monitoring the OBDII port for suspicious activity, such as an attack, and notifying the driver of any suspicious activity. The operations also include counteracting the attack including shutting off power, placing the vehicle in safe mode, flooding the CAN bus so that some of the ECUs operate at a reduced level of functionality and others are disabled, or sending a reset command to the module being attacked.

Another embodiment of the invention provides a system for securing a controlled area network (CAN) of a vehicle, the CAN having a. plurality of electronic control units (ECUs) for several electronically-controlled vehicular systems. The system includes a security monitoring device configured to be connected to an on-board diagnostic port (OBD) of a vehicle, and includes a processing unit configured to monitor the OBD port for activity, determine whether any monitored activity includes suspicious activity, generate an alert when suspicious activity is detected, and generate a message to counteract the suspicious activity to minimize harm resulting from the suspicious activity.

In some embodiments, the security monitoring device includes a Controller Area Network (CAN) driver, at least one processing unit, and at least one physical computer storage medium. The at least one physical computer storage medium includes stored executable instructions that, when executed by the at least one processing unit, cause the at least one processing unit to perform operations to monitor the OBDII port. The stored instructions relate to operations for monitoring the OBD port for suspicious activity, such as an attack, and notifying the driver of any suspicious activity. In some embodiments, the operations include counteracting the attack by shutting off power, placing the vehicle in safe mode, flooding the CAN bus so that some of the ECUs operate at a reduced level of functionality and others are disabled, or sending a reset command to the ECU being attacked.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units"

and "controllers" described in the specification can include standard processing components, such as one or more processors, one or more memory modules including non-transitory computer-readable medium, one or more input/output interfaces, and various connections (e.g., a system bus) connecting the components.

Figure 1:
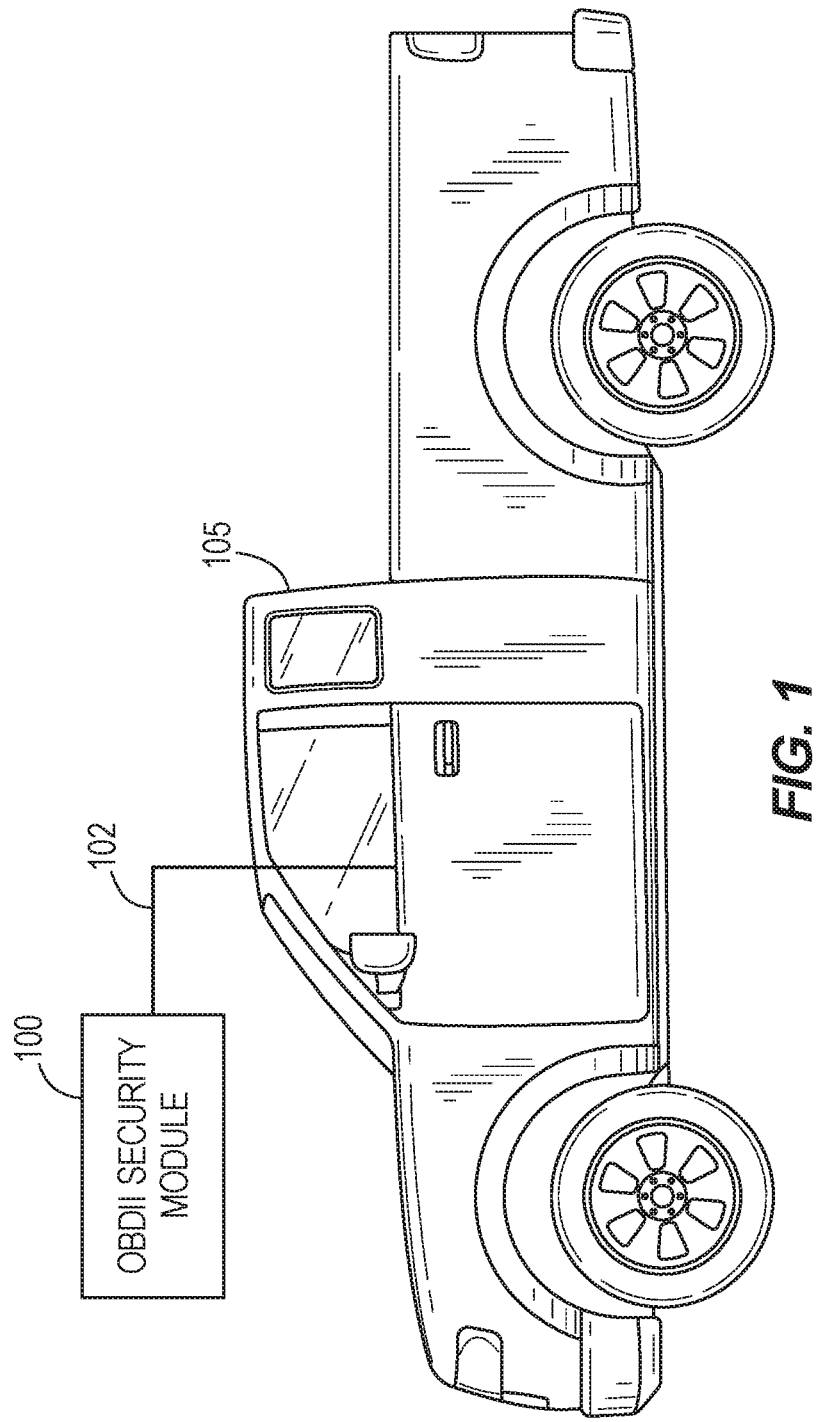
FIG. 1 depicts a security monitoring device coupled to a vehicle.

FIG. 1 depicts an on-board diagnostic type II (OBDII) port security monitoring device 100 coupled to an OBDII port 300 (see FIG. 3) of the vehicle 105, although the invention can be used with other types of ports. The security monitoring device 100 contains a connector 102 that couples the security monitoring device 100 to OBDII port 300. In another embodiment, the security monitor 100 and OBDII could be coupled using wireless adapters or transceivers. The security monitoring device 100 may be configured for the specific type of vehicle 105 to which it is coupled. Connecting the security monitoring device 100 to the vehicle 105 allows the security monitoring device to monitor the OBDII port security and to alert the driver of an attack or suspicious activity. The alert may be an LED turning ON, a warning buzzer, or another type of warning. The warning allows the driver to stop driving the vehicle 105 before the attack causes harm. When a vehicle diagnostic test is performed by a service technician or other entity, the security monitoring device is disconnected from the vehicle 105 so that the security monitoring device does not detect the vehicle diagnostic test as an attack or suspicious activity.

Figure 2:
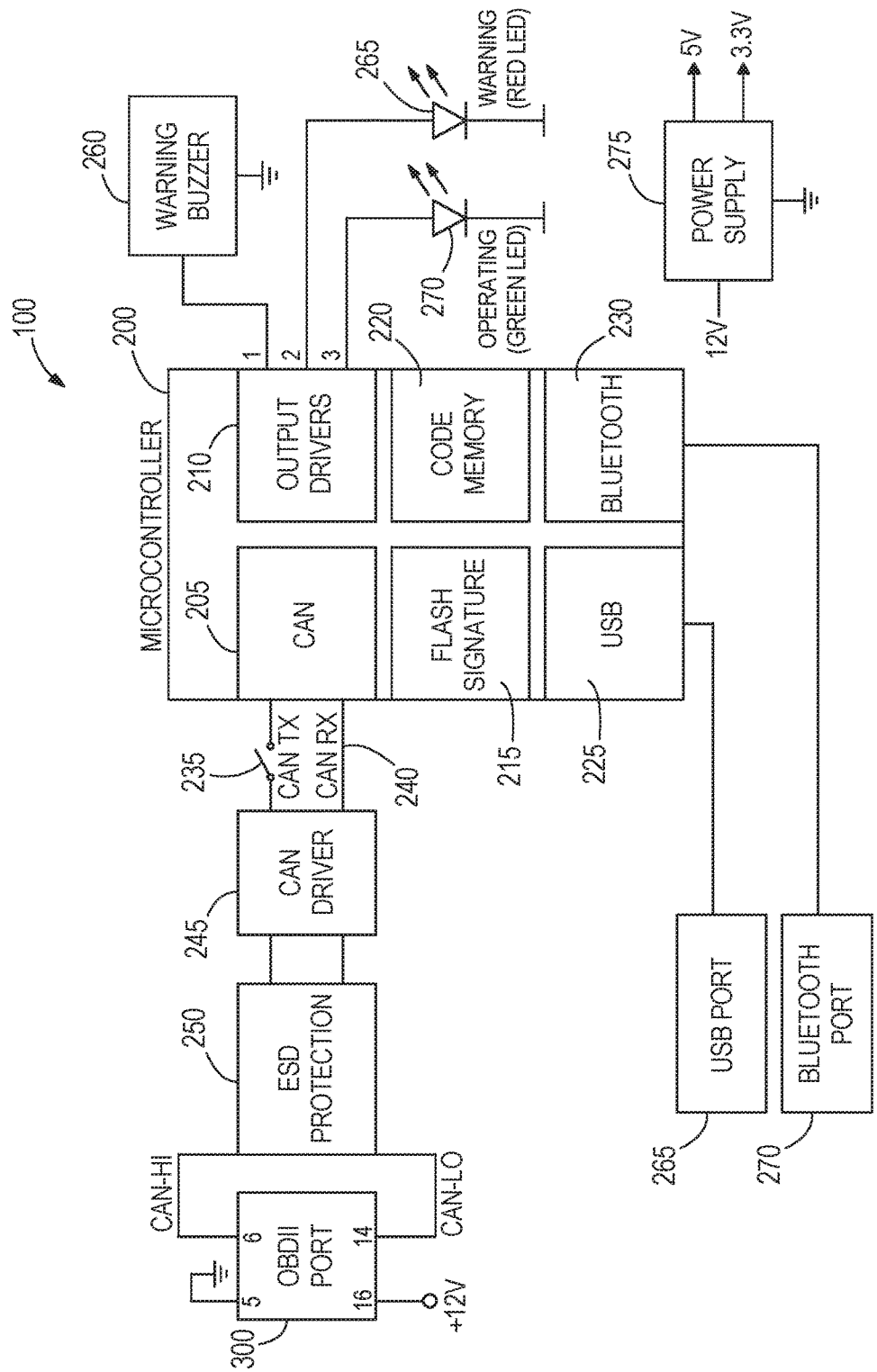
FIG. 2 is a schematic of a security monitoring device incorporating the invention.

FIG. 2 depicts the security monitoring device 100. The security monitoring device 100 includes a microcontroller 200. The microcontroller includes a Controlled Area Network (CAN) driver 205, output drivers 210, a flash signature 215, a code memory 220, a Universal Serial Bus (USB) interface 225, and a Bluetooth interface 230.

Figure 3:
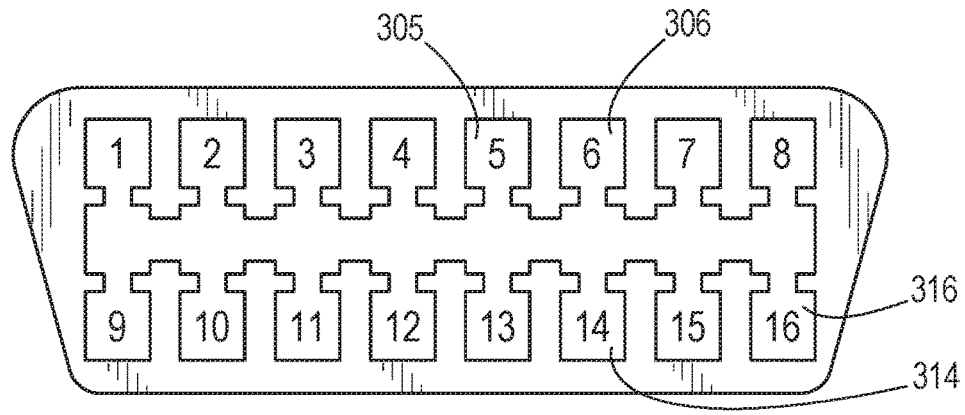
FIG. 3 is a pinout diagram of a typical motor vehicle OBDII connector port.

CAN driver 205 is coupled to a CAN driver 245 with a CAN transmission line 235 and a CAN receiver line 240. The CAN transmission line 235 can be opened or closed with a switch. The CAN driver is coupled to the Electrostatic Discharge (ESD) protection 250. The ESD protection 250 is coupled to the OBD II port 255 with both a CAN high and CAN low connection for communication. The OBDII port 300 is coupled to the vehicle 105 (FIG. 1). As shown in FIG. 3, OBDII port 300 includes a signal ground pin 305 (pin 5 of the connector), a CAN High ISO J-2234 connection pin 306 (pin 6), a CAN Low ISO J-2234 connection 314 (pin 14), and a 12 Volt power connection pin 316 (pin 16).

In FIG. 2, output drivers 210 are coupled to a warning status interface. The warning status interface includes a warning buzzer 260. The warning buzzer 260 signals the driver when there is suspicious activity detected at the OBDII port 300. Additionally, the warning status interface includes a red LED 265 and a green LED 270. The red LED 265 illuminates as a warning signal that suspicious activity has been detected. The warnings allows the driver to stop driving the vehicle 105 (FIG. 1) before an attack causes harm. The green LED is illuminated when the security monitoring device 100 is operating and no suspicious activity is detected.

The flash signature 215 and code memory 220 are the physical computer storage media that include stored instructions, which when executed by the at least one microcontroller or processing unit 200, cause the processing unit 200 to perform operations to monitor the OBDII port security. When the stored instructions are executed, they determine if suspicious messages or signals are being received through the CAN driver 205. Messages are compared to a baseline for each electronic control unit (ECU) in the system being monitored; the baseline includes types of messages that a particular ECU is accustomed to seeing. If a message does not fall into that baseline group, then the message is flagged as suspicious activity. A suspicious message is an indication of an attack or that there is a faulty device (e.g. an ECU) on the CAN bus. If a suspicious message or suspicious activity is detected, a warning is sent to the driver that could include an LED 265 turning ON, a warning buzzer 260 emitting an audible warning, or another type of visual or audible warning. The warning allows the driver to stop driving the vehicle 105 (FIG. 1) before the attack causes harm such as the loss of control of a vehicular function or system.

Additionally, the stored instructions may counteract the attack by shutting off power, sending a reset command to the ECU that is the target of the attack, or causing the vehicle 105 (FIG. 1) to enter into a safe mode. If the vehicle 105 (FIG. 1) enters a safe mode, the advanced or unnecessary features of the vehicle 105 are turned off (e.g. the radio, seat heaters) by reducing the functionality or disabling the ECUs which control such non-critical systems, but critical, necessary and active-passive safety functions are available such as standard braking, power-assisted steering, transmission control, and air bags.

Another method of counteracting suspicious activity is to notify non-targeted ECUs of the attack so that the non-targeted ECUs may run their pre-programmed countermeasures. For example, the invention can determine that a first critical ECU is being attacked and then notify other critical system ECUs of the attack on the first critical ECU. Another countermeasure is to transmit a reset command to the first critical ECU that is determined to be the target of suspicious activity.

Another method of counteracting suspicious activity or an attack is flooding the CAN bus to prevent the attack from spreading to other ECUs. The CAN bus is a message system where the messages travel based on priority. When multiple messages are sent at the same time, the highest priority message is sent through the CAN bus. In order to flood the CAN bus, messages with a high priority are sent so that lower priority, or attack messages, cannot get through the CAN bus to the other ECUs. Many other methods of counteracting may be included in the storage device instructions.

The USB interface 225 on the processing unit 200 is coupled to a USB port 265. The Bluetooth interface 230 on the microcontroller 200 is connected to a Bluetooth port 270. The Bluetooth port includes a signal ground, a CAN high connection, a CAN low connection, and a battery power connection. Both the USB port and Bluetooth port may be used to upload protection software to the security monitoring device 100 (FIG. 1) or upgrades of that software.

The power supply 275 for the system includes an input of 12V and outputs of 5V and 3.3 Volts.

In some implementations, the above-described system is controlled using at least one controller, the controller can include one or more processing units (e.g., a processor, application specific integrated circuits ("ASIC"), etc.), one or more memory modules including non-transitory computer-readable medium, and on or more input/output interfaces. The controller uses the input/output interfaces to send and receive information with one or more sensors or systems external to the controllers (e.g., over a vehicle communication bus, such as a CAN bus). In some implementations, the controller can also include one or more internal sensors or systems.

Various features and advantages of the invention are set forth in the following claims.

What is claimed is:

1. A method of securing a controlled area network (CAN) of a vehicle, the CAN having a plurality of electronic control units (ECUs) for controlling electronically-controlled vehicular systems, the method comprising:
monitoring, using an electronic processor, an on-board diagnostic (OBD) port of the vehicle for activity, the OBD port being interconnected with the CAN, wherein the monitoring includes:
storing a baseline message profile for at least one of the ECUs of the CAN;
comparing a message in the monitored activity with the baseline message profile of the at least one ECU in the CAN;
flagging a message in the monitored activity as suspicious activity when the message in the monitored activity does not fit the baseline profile of the at least one ECU;
determining whether the flagged message relates to a critical ECU of the plurality of ECUs or to a non-critical ECU of the plurality of ECU;
generating an alert when any monitored activity is suspicious activity that indicates an attack; and
counteracting the suspicious activity to minimize potential harm resulting from the suspicious activity, the counteracting including
determining that the suspicious activity is an attack on a first critical ECU of the plurality of ECUs;
notifying a non-targeted second critical ECU of the plurality of ECUs about the attack on the first critical ECU; and
disabling a non-critical ECU of the plurality of ECUs when the determining determines that the flagged message relates to a critical ECU of the plurality of ECUs.

2. The method of claim 1, wherein the monitoring includes:
connecting a security monitoring device to the ODB port of the vehicle.

3. The method of claim 1, wherein the generating includes:
generating at least one of an audible alert and a visual alert.

4. The method of claim 1, wherein the counteracting includes:
transmitting a reset command to the first critical ECU.

5. A system for securing a controlled area network (CAN) of a vehicle, the CAN having a plurality of electronic control units (ECUs) for controlling electronically-controlled vehicular systems, the system comprising:
a security monitoring device configured to be connected to an on-board diagnostic port (OBD) of the vehicle, the OBD port being interconnected with the CAN, the security monitoring device including
a warning status interface through which an alert is transmitted that suspicious activity has been detected;
an electronic processor having
a CAN driver configured to receive messages that originate external of the CAN;
an output driver coupled to the warning status interface;
wherein the electronic processor is configured to:
monitor the OBD port for activity;
determine whether any monitored activity includes suspicious activity, including
store a baseline message profile for at least one ECU of the plurality of ECUs;
compare a message in the monitored activity with the baseline message profile of the at least one ECU;
flag a message in the monitored activity as constituting suspicious activity when the message in the monitored activity does not fit the baseline message profile of the at least one ECU;
generate an alert when suspicious activity is detected;
generate a message to counteract the suspicious activity to minimize harm resulting from the suspicious activity, including
determine that the suspicious activity is an attack on a first critical ECU of the plurality of ECUs;
notify a non-targeted second critical ECU of the plurality of ECUs about the attack on the first critical ECU; and
disable a non-critical ECU of the plurality of ECUs of the vehicle when the electronic processor determines that the flagged message relates to a critical ECU of the plurality of ECUs.

6. The system of claim 5, wherein the electronic processor is configured to:
generate at least one of an audible and a visual alert when any monitored activity includes suspicious activity.

7. The system of claim 5, wherein the electronic processor is configured to:
transmit a reset command to the first critical ECU.

8. The method of claim 1, further comprising:
running a pre-programmed countermeasure on the non-targeted second critical ECU.

9. The system of claim 5, wherein the electronic processor is further configured to
run a pre-programmed countermeasure on the non-targeted second critical ECU.

10. A method of securing a controlled area network (CAN) of a vehicle, the CAN having a plurality of electronic control units (ECUs) for controlling electronically-controlled vehicular systems, the method comprising:
monitoring, using an electronic processor, an on-board diagnostic (OBD) port of the vehicle for activity, the OBD port being interconnected with the CAN, wherein the monitoring includes:
storing a baseline message profile for at least one of the ECUs of the plurality of ECUs;
comparing a message in the monitored activity with the baseline message profile of the at least one ECU;
flagging a message in the monitored activity as suspicious activity when the message in the monitored activity does not fit the baseline profile of the at least one ECU;
generating an alert when any monitored activity is suspicious activity that indicates an attack;
counteracting the suspicious activity to minimize potential harm resulting from the suspicious activity, the counteracting including
determining that the suspicious activity is an attack on a first critical ECU of the plurality of ECUs; and
flooding the CAN bus with high priority messages so that lower priority attack messages cannot get through the CAN bus to a non-attacked second ECU of the plurality of ECUs.

11. The method of claim 10, wherein the monitoring includes:
connecting a security monitoring device to the ODB port of the vehicle.

12. The method of claim 10, wherein the monitoring includes: determining whether the flagged message relates to a critical ECU of the plurality of ECUs or to a non-critical ECU of the plurality of ECUs.

13. The method of claim 10, wherein the counteracting includes: disabling a non-critical ECU of the plurality of ECUs when the determining determines that the flagged message relates to a critical ECU of the plurality of ECUs.

14. The method of claim 10, wherein the generating includes:
generating at least one of an audible alert and a visual alert.

15. The method of claim 10, wherein the counteracting includes:
transmitting a reset command to the first critical ECU.

16. A system for securing a controlled area network (CAN) of a vehicle, the CAN having a plurality of electronic control units (ECUs) for controlling electronically-controlled vehicular systems, the system comprising:
a security monitoring device configured to be connected to an on-board diagnostic port (OBD) of the vehicle, the OBD port being interconnected with the CAN, the security monitoring device including
a warning status interface through which an alert is transmitted that suspicious activity has been detected;
an electronic processor having
a CAN driver configured to receive messages that originate external of the CAN;
an output driver coupled to the warning status interface;
wherein the electronic processor is configured to:
monitor the OBD port for activity;
determine whether any monitored activity includes suspicious activity, including
store a baseline message profile for at least one ECU of the plurality of ECUs;
compare a message in the monitored activity with the baseline message profile of the at least one ECU;
flag a message in the monitored activity as constituting suspicious activity when the message in the monitored activity does not fit the baseline message profile of the at least one ECU;
generate an alert when suspicious activity is detected;
generate messages to counteract the suspicious activity to minimize harm resulting from the suspicious activity, including
determine that the suspicious activity is an attack on a first critical ECU of the plurality of ECUs; and
flood the CAN bus with high priority messages so that lower priority attack messages cannot get through the CAN bus to a non-attacked second ECU of the plurality of ECUs.

17. The system of claim 16, wherein the electronic processor is configured to:
disable a non-critical ECU of the plurality of ECUs when the electronic processor determines that the flagged message relates to a critical ECU of the plurality of ECUs.

18. The system of claim 16, wherein the electronic processor is configured to:
generate at least one of an audible and a visual alert when any monitored activity includes suspicious activity.

19. The system of claim 16, wherein the electronic processor is configured to:
transmit a reset command to the first critical ECU.

* * * * *